United States Patent
Chernoff et al.

(10) Patent No.: US 6,948,740 B2
(45) Date of Patent: Sep. 27, 2005

(54) VEHICLE WITH MULTIPLE DRIVER INTERFACES

(75) Inventors: Adrian B. Chernoff, Royal Oak, MI (US); James Thomas Embach, Rochester Hills, MI (US); Julien Montousse, Madison Heights, MI (US); Joseph F. Szczerba, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 205 days.

(21) Appl. No.: 10/347,176

(22) Filed: Jan. 17, 2003

(65) Prior Publication Data

US 2004/0140145 A1 Jul. 22, 2004

(51) Int. Cl.$^7$ ............................................... B62D 1/18
(52) U.S. Cl. .................................................... 280/775
(58) Field of Search ................................ 280/775, 778; 74/493

(56) References Cited

U.S. PATENT DOCUMENTS

| | | | |
|---|---|---|---|
| 3,556,549 A | * 1/1971 | Hershman et al. | ........... 280/775 |
| 5,366,281 A | 11/1994 | Littlejohn | ....................... 303/3 |
| 5,823,636 A | 10/1998 | Parker et al. | ................... 303/3 |
| 6,176,341 B1 | 1/2001 | Ansari | ......................... 180/402 |
| 6,208,923 B1 | 3/2001 | Hommel | ...................... 701/42 |
| 6,219,604 B1 | 4/2001 | Dilger et al. | .................. 701/41 |
| 6,305,758 B1 | 10/2001 | Hageman et al. | ......... 303/115.2 |
| 6,318,494 B1 | 11/2001 | Pattok | ......................... 180/402 |
| 6,370,460 B1 | 4/2002 | Kaufmann et al. | ........... 701/41 |
| 6,390,565 B2 | 5/2002 | Riddiford et al. | .............. 303/3 |
| 6,394,218 B1 | 5/2002 | Heitzer | ....................... 180/402 |

* cited by examiner

Primary Examiner—Faye M. Fleming
(74) Attorney, Agent, or Firm—Kathyrn A. Marra (57) ABSTRACT

A vehicle driver control input assembly includes a seat with a steering wheel structure configured to provide non-mechanical steering signals to a steer-by-wire system. The steering wheel structure is collapsible underneath the seat for storage. First and second movable arm structures are connected to opposing sides of the seat and are movable between an upright position for use and a lowered position for storage. The movable arm structures include control input members to provide non-mechanical steering signals to the steer-by-wire system. A plurality of selectable driver control input devices may be interchangeably connected with the vehicle to provide steering, braking and/or acceleration signals to the vehicle as desired.

10 Claims, 10 Drawing Sheets

VEHICLE WITH MULTIPLE DRIVER INTERFACES

TECHNICAL FIELD

The present invention relates to a vehicle having multiple drive-by-wire. interfaces which may be interchangeably or selectively used, for driving the vehicle.

BACKGROUND OF THE INVENTION

The implementation of drive-by-wire technology in the automotive industry (e.g. steer-by-wire, brake-by-wire, throttle-by-wire, shift-by-wire, etc.) is a result of continuing efforts to reduce cost, increase reliability, and reduce weight.

In drive-by-wire systems, mechanical devices with linkages and mechanical connections are being replaced with sensors, actuators and electronics. For example, in a conventional steering system, which consists of a steering wheel, a steering column, a power assisted rack and pinion system, and tie rods, the driver turns a steering wheel which, through, the various mechanical components, causes the road wheels of the vehicle to turn. In a steer-by-wire system, a number of the mechanical components between the steering wheel and the road wheels of the vehicle are replaced with a sensor at the steering wheel and both sensors and actuators at the road wheels. In a steer-by-wire system, the rotation of the steering wheel is measured by the sensor. This rotation measurement is processed by the electronics to generate command signals for the actuators to turn the road wheels.

Drive-by-wire modules may reduce assembly time and cost and result in an improved driver interface because the elimination of mechanical connections to the steering column give engineers more flexibility in designing the driver interface with regard to location, type and performance. Vehicle designers will also have more flexibility in the placement of hardware under the hood and in the interior to support alternative power trains, enhanced styling, and improved interior functionality.

Without a steering column, there is no need to provide an adjustable seat, so seat content may be reduced. The absence of the steering column may also enable integrated vehicle stability control systems, collision avoidance systems, and automated driving systems.

Drive-by-wire technology may also increase packaging flexibility, simplify assembly, enable tunable steering feel, and advanced vehicle control.

SUMMARY OF THE INVENTION

The invention provides multiple man-machine interfaces which can co-exist in a vehicle, and/or be selectively interchanged with other drive-by-wire control input devices. The man-machine interface or driver control input device is a by-wire device which may incorporate all vehicle controls (steering, braking and acceleration) in a hand-operated system, and may alternatively provide redundant electrical control separately from mechanical steering, braking or acceleration systems on a vehicle. The invention provides the driver with the ability to select or interchange the manner in which driving signals are communicated to the vehicle.

One aspect of the invention provides, a vehicle driver control input assembly in which a steering wheel structure is attached to a seat and configured to provide non-mechanical steering signals to a steer-by-wire system. The steering wheel structure is supported by a collapsible support post which enables the steering wheel structure to be collapsed below the seat for storage. First and second movable arm structures are connected to opposing sides of the seat and movable between an upright position for use and a lowered position for storage. The first and second movable arm structures are movable vertically and laterally with respect to a forward-facing direction of the seat. The first and second movable arm structures each include control input devices to provide non-mechanical steering signals to the steer-by-wire system. Accordingly, the driver may select the steering wheel structure or first and second movable arm structures for driving the vehicle.

Alternatively, another aspect of the may provide a by-wire steering device mounted on a conventional instrument panel or bulkhead, and another by-wire steering device, such as the movable arm structures described above, may also be provided to enable the driver to select the means by which steering control signals are input to the vehicle.

The steering wheel structure and control input devices may also include a braking demand input mechanism for sending braking signals to a brake-by-wire system. The steering wheel structure and control input devices may further include an acceleration demand input mechanism for sending acceleration signals to an energy conversion system of the vehicle.

By way of example, the braking demand input mechanism may be a braking lever positioned adjacent a rear side of the steering wheel. Preferably, the collapsible support post includes an upper portion pivotally mounted to a lower portion, and the lower portion is pivotally and slidably mounted to the seat.

The control input devices may each include a rotatable hand grip having a braking demand input mechanism and/or an acceleration demand input mechanism. The first and second movable arm structures preferably each include a support sleeve to support the forearm of a driver for comfort and convenience.

In accordance with another aspect of the invention, a vehicle includes a steer-by-wire system operatively engaged with a plurality of vehicle wheels for steering the vehicle. The steer-by-wire system includes a connector port for receiving steering control signals. A plurality of selectable driver control input devices are interchangeably connectable to the connector port for sending steering control signals to the connector port in response to mechanical steering motion input by a driver, thereby providing a vehicle driver with different options for steering the vehicle.

A brake-by-wire system and energy conversion system may also be provided on the vehicle, responsive to non-mechanical control signals, and each operatively engaged with the connector port for receiving braking signals and acceleration signals from the selected driver control input device.

One of the plurality of selectable driver control input devices may include first and second control posts each having a hand grip, the control posts being pivotally movable forwardly and rearwardly and sufficiently linked together such that forward movement of one control post will result in an opposite rearward movement of the other control post. This movement causes non-mechanical steering signals to be sent to the steer-by-wire system.

Another one of the plurality of selectable driver control input devices may include a non-rotatable wheel having first and second movable hand grips slidable along the wheel to facilitate sending steering signals to the steer-by-wire system.

A further one of the plurality of selectable driver control input devices may include first and second rotatable hand grips positioned at the ends of first and second arm rests, respectively. The first and second hand grips are rotatable to facilitate sending steering signals to the steer-by-wire system.

Another one of the plurality of selectable driver control input devices may include a steering wheel structure which is collapsible underneath a seat via a collapsible support post connected to the seat.

Another one of the plurality of selectable driver control input devices may include first and second base members and first and second control members each configured to support an arm of a driver and pivotally movable with respect to the first and second base members in a generally horizontal plane to facilitate sending steering control signals to the steer-by-wire system. The first and second control members include hand grips.

Any of the above referenced hand grips may also include an accelerator button and a braking button to facilitate sending braking and acceleration signals to a brake-by-wire system and an energy conversion system of the vehicle. The braking and acceleration buttons may alternatively be levers, compression sensors, or other devices. Preferably, vehicle braking force or acceleration is relative to the force applied to the button or lever. Also, preferably when a desired speed is achieved, the accelerator buttons may be released, and the vehicle speed will be maintained, such as by cruise control. In other words, the vehicle would maintain a steady speed unless acceleration or braking signals are being sent by a driver.

The braking buttons or acceleration buttons, or other control features, may be linked together such that depressing either button, left or right, will stop or accelerate the vehicle. Active force feedback is utilized to simulate vehicle dynamic conditions and enhance driving performance.

Further, rather than being interchangeably connectable, a plurality of driver control input devices may be permanently connected to the vehicle and engaged with the steer-by-wire system so that the driver has different options for inputting steering signal to the vehicle, as well as braking signals, acceleration signals, etc.

Preferably, the steering wheel structure, movable arm structures, and/or driver control input devices are fully adjustable to optimize user comfort.

The above objects, features and advantages, and other objects, features and advantages of the present invention are readily apparent from the following detailed description of the best modes for carrying out the invention when taken in connection with the accompanying drawings.

DESCRIPTION OF THE PREFERRED EMBODIMENTS

Figure 1:
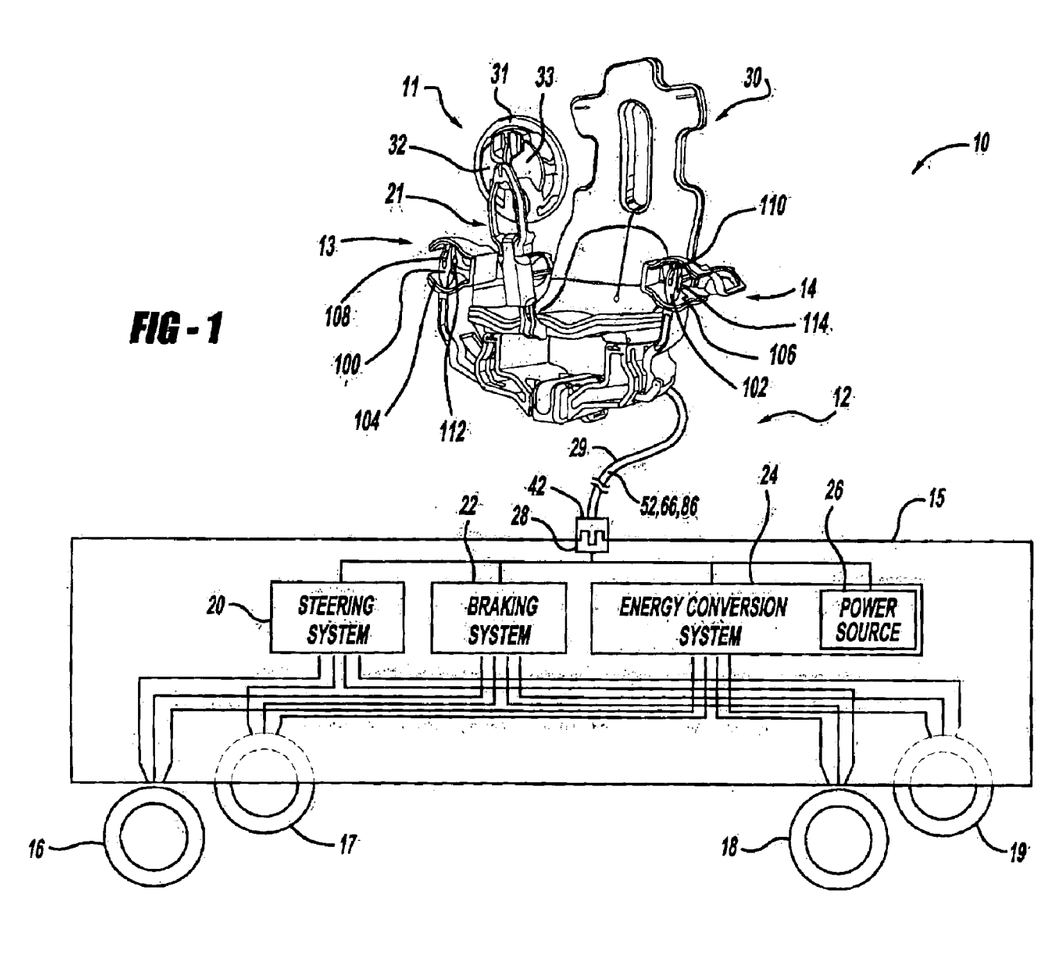
FIG. 1 is a schematic illustration (not to scale) of a vehicle incorporating multiple man-machine interfaces in accordance with the invention.

Referring to FIG. 1, a vehicle 10 in accordance with the invention includes a vehicle drive system 12 and a chassis 15. The vehicle drive system 12 includes driver control input devices 11, 13, 14 which are operatively connected with a steering system 20, braking system 22 and energy conversion system 24. The chassis 15 includes a frame and has four wheels 16, 17, 18, 19 that are operable with respect to the chassis 15. The vehicle 10 is preferably an automobile, but the invention also contemplates that the vehicle may be a tractor, fork-lift, or other industrial vehicle. Those skilled in the art will recognize materials and fastening methods suitable for attaching the wheels 16, 17, 18, and 19 to the chassis 15.

As shown in FIG. 1, the driver control input device 11 is a steering wheel structure which is configured to provide non-mechanical steering signals to the steer-by-wire system 20. The steering wheel structure 11 is supported by a collapsible support post 21 which enables the steering wheel structure 11 to be collapsed below the seat 30 for storage.

The steering wheel structure 11 includes a steering wheel 31 which is rotatable with respect to the support post 21 to generate non-mechanical steering signals. The steering wheel structure 11 also includes an acceleration demand lever 32 configured to provide acceleration signals to the energy conversion system 24 when actuated, and a braking demand lever 33 configured to provide braking control signals to the braking system 22 when actuated.

Accordingly, when the steering wheel 31 is rotated with respect to the post 21, a steering transducer (described later with respect to FIG. 2) generates non-mechanical steering control signals 52 which are sent through the connector wire 29, through the connector ports 42, 28 to the steering system 20.

Similarly, the acceleration demand lever 32 is operative to provide energy conversion system control signals 86 through the connector wire 29 and connector ports 42, 28 to the energy conversion system 24. These signals 86 are generated by an acceleration transducer, to be described later with reference to FIG. 4, when the acceleration demand lever 32 is pulled.

Further, the braking demand lever 33 is operative to provide electrical braking control signals 66 through the connector wire 29 and connector ports 42, 28 to the braking system 22. These signals 66 are generated by a braking transducer, to be described later with reference to FIG. 3, when the braking demand lever 33 is pulled.

The driver control input devices 13, 14 are implemented as first and second movable arm structures which are connected to opposing sides of the seat and movable vertically and laterally with respect to a forward-facing direction of the seat between an upright position for use and a lowered position for storage. The first and second movable arm structures each include control input members 100, 102 to provide non-mechanical steering signals to the steer-by-wire system 20. The control input members 100, 102 are implemented as rotatable hand grips which are rotatable with respect to the support sleeves 104, 106 for generating non-mechanical steering signals via a steering transducer, such as that described later with reference to FIG. 2.

Figure 3:
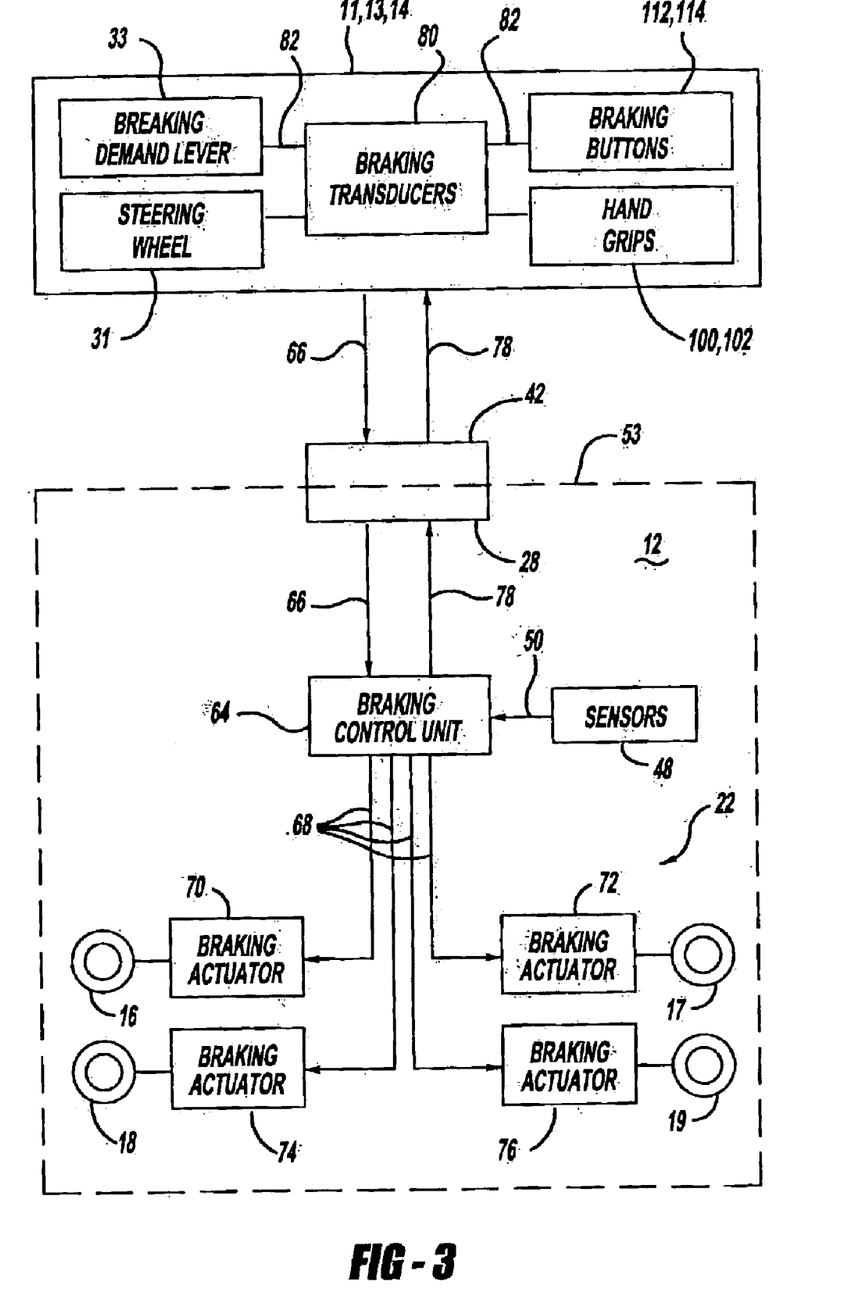
FIG. 3 is a schematic illustration of a braking system for use with the vehicle of FIG. 1.

The rotatable hand grips 100, 102 also include acceleration demand buttons 108, 110 and braking demand buttons 112, 114 to provide acceleration and braking signals 86, 66, via acceleration and braking transducers, such as those described later with reference to FIGS. 3 and 4, through the connector wire 29, through the connector ports 42, 28 to the energy conversion system 24 and braking system 22.

Since the steering wheel structure 11 is collapsible beneath the seat 30, and the movable arm structures 13, 14 may be raised and lowered into respective use and storage positions, the driver is provided with different options for providing driving signals to the vehicle.

The steering system 20, braking system 22 and energy conversion system 24 are each mounted to a frame of the chassis 15 and ate responsive to non-mechanical control signals, as described above. The energy conversion system 24 is connected to a power source 26. Embodiments of such systems are described subsequently with respect to FIGS. 2–4.

The chassis 15 includes a frame which provides a rigid structure to which the steering system 20, braking system 22 and energy conversion system 24 as well as the wheels 16, 17, 18, 19 are mounted, as shown schematically in FIG. 1, and is configured to support an attached body. A person of ordinary skill in the art will recognize that the chassis 15 can take many different forms. For example, the chassis 15 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan", wherein integrated rails and cross members are formed in sheets of metal or other suitable material, with other formations to accommodate various system components. The structural frame may also be integrated with various vehicle components. Of course, the above description is merely exemplary, and the invention may alternatively be useful in a body-on-frame assembly, body-frame integral assembly, non-passenger vehicle, such as a forklift, etc.

As described previously, the chassis 15 includes the connector port 28, also referred to as a drive-by-wire connector port, that is mounted with respect to the chassis 15 and operably connected to the steering system 20, braking system 22 and energy conversion system 24. Persons skilled in the art will recognize various methods for mounting the connector port 28 to the chassis 15. In the preferred embodiment, the connector port 28 is located on a top face of the chassis 15, in reasonably close proximity to the driver control input device 11.

The connector port 28 of the preferred embodiment may perform multiple functions, or select combinations thereof. First, the connector port 28 may function as an electrical power connector, i.e., it may be configured to transfer electrical energy generated by components on the vehicle 10 to the operator interface or other non-frame destination. Second, the connector port 28 may function as a control signal receiver, i.e., a device configured to transfer non-mechanical control signals from a non-vehicle source, such as the driver control input device 11, to controlled systems including the steering system 20, braking system 22 and energy conversion system 24. Third, the connector port 28 may function as a feedback signal conduit through which feedback signals are made available to a vehicle driver. Fourth, the connector port 28 may function as an external programming interface through which software containing algorithms and data may be transmitted for use by controlled systems. Fifth, the connector port 28 may function as an information conduit through which sensor information and other information is made available to a vehicle driver. The connector port 28 may thus function as a communications and power "umbilical" port through which all communications between the vehicle and the attached driver control input device 11 and other attachments to the chassis are transmitted. The connector port 28 is essentially an electrical connector. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

The steering system 20 is operatively connected to the front wheels 16, 17 (but may be connected to rear wheels). Preferably, the steering system 20 is responsive to non-mechanical control signals. In the preferred embodiment, the steering system 20 is by-wire. A by-wire system is characterized by control signal transmission in electrical form. In the context of the present invention, "by-wire" systems, or systems that are controllable "by-wire", include systems-configured to receive control signals in electronic form via a control signal receiver and respond in conformity to the electronic control signals.

Figure 2:
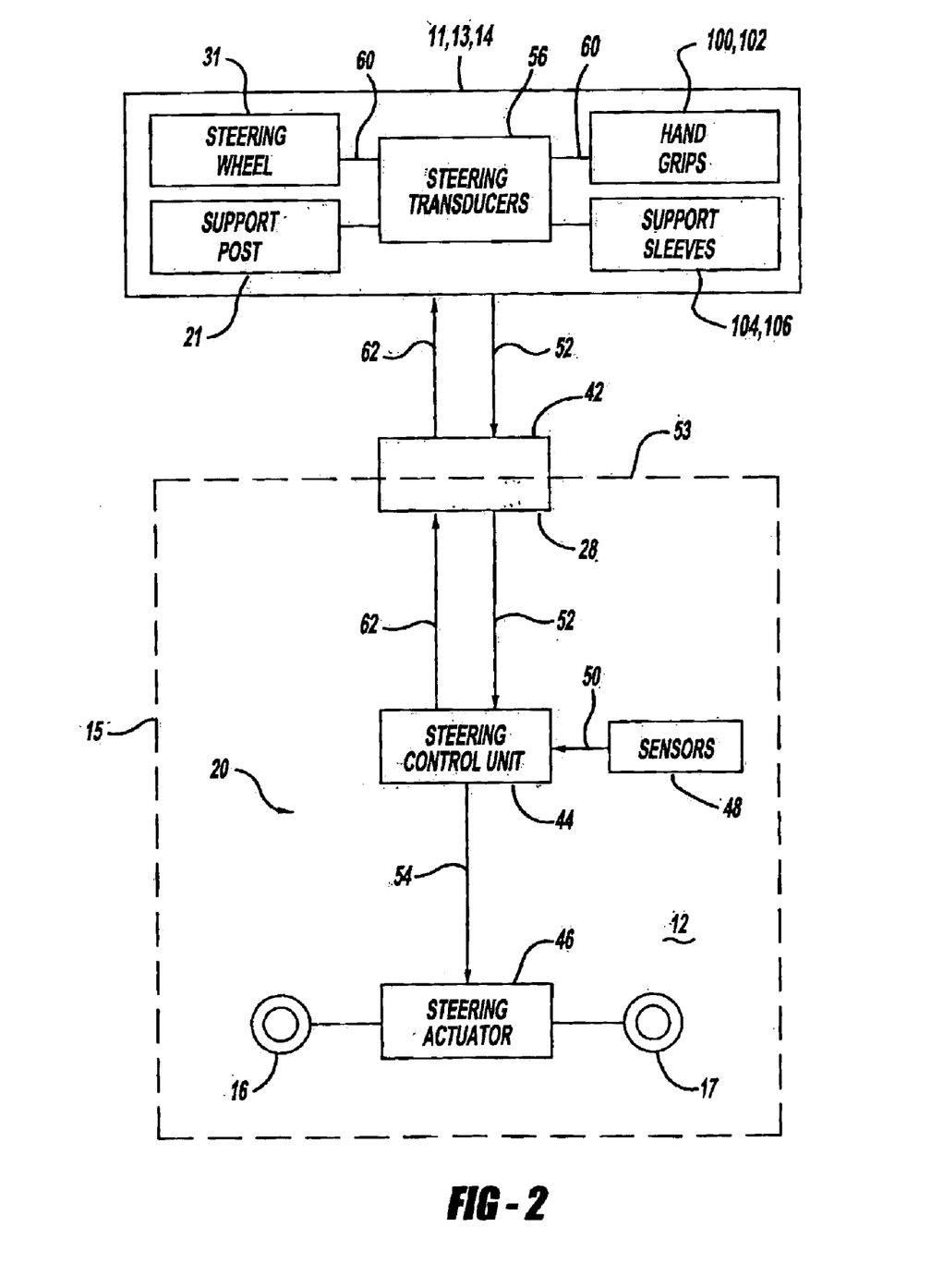
FIG. 2 is a schematic illustration of a steering system for use with the vehicle of FIG. 1.

FIG. 2 is a schematic illustration of a steering system for use with the vehicle of FIG. 1. The by-wire steering system 20 of the preferred embodiment includes a steering control unit 44, and a steering actuator 46. Sensors 48 are located on the vehicle 10 and transmit sensor signals 50 carrying information concerning the state or condition of the vehicle and its component systems. The sensors 48 may include position sensors, velocity sensors, acceleration sensors, pressure sensors, force and torque sensors, flow meters, temperature sensors, etc. The steering control unit 44 receives and processes sensor signals 50 from the sensors 48 and electrical steering control signals 52 from the connector port 28, and generates steering actuator control signals 54 according to a stored algorithm. A control unit typically includes a microprocessor, ROM and RAM and appropriate input and output circuits of a known type for receiving the various input signals and for outputting the various control commands to the actuators. Sensor signals 50 may include yaw rate, lateral acceleration, angular wheel velocity, tie-rod force, steering angle, chassis velocity, etc.

The steering actuator 46 is operably connected to the front wheels 16, 17 and configured to adjust the steering angle of the front wheels 16, 17 in response to the steering actuator control signals 54. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 46 is an electric drive motor configured to adjust a mechanical steering rack.

Referring to FIG. 2, the preferred embodiment of the vehicle is configured such that it is steerable by any source of compatible electrical steering control signals 52 connected to the connector port 28. The connector port 28 interfits with the connector 42 at the connector interface 53. FIG. 2 schematically depicts steering transducers 56 located within the driver control input devices 11, 13 and 14 operatively connected between the steering wheel 31 and the support post 21, and between the rotatable hand grips 13, 14 and the support sleeves 104, 106. The steering transducers 56 are connected to a complementary connector 42. Transducers convert the mechanical control signals of a vehicle driver to non-mechanical control signals. When used with a by-wire system, transducers convert the mechanical control signals to electrical control signals usable by the by-wire system. Transducers utilize sensors, typically position and force sensors, to convert the mechanical input to an electrical signal.

The complementary connector 42 is coupled with the connector port 28 of the connector interface 53. The steering transducers 56 convert vehicle driver-initiated mechanical movement 60 of the steering wheel 31 or hand grips 100, 102 into electrical steering control signals 52 which are transmitted via the connector port 28 to the steering control unit 44. The steering transducers 56 may include, for example, a curved rack and pinion with an optical sensor to sense the position of the pinion along the curved rack as the steering wheel 31 or hand grips 100, 102 are pivoted with respect to the support post 21 or support sleeves 104, 106, respectively. A motor may also be included and operatively engaged with the pinion to provide force feedback to the driver. In the preferred embodiment, the steering control unit 44 generates steering feedback signals 62 for use by a vehicle driver and transmits the steering feedback signals 62 through the connector port 28. Some of the sensors 48 monitor steering motion, such as motion along a rack, and vehicle speed. This information is processed by the steering control unit 44 according to a stored algorithm to generate the steering feedback signals 62.

Accordingly, the steering wheel 31 and rotatable hand grips 100, 102 provide redundant controls for steering, and are therefore interchangeably usable.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide, tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 22 is mounted to the chassis 15 and is operably connected to the wheels 16, 17, 18, 19. The braking system 22 is configured to be responsive to non-mechanical control signals. In the preferred embodiment, the braking system 22 is by-wire, as depicted schematically in FIG. 3, wherein like reference numbers refer to like components from FIG. 2. Sensors 48 transmit sensor signals 50 carrying information concerning the state or condition of the vehicle and its component systems to a braking control unit 64. The braking control unit 64 is connected to the connector port 28 and is configured to receive electrical braking control signals 66 via the connector port 28. The braking control unit 64 processes the sensor signals 50 and the electrical braking control signals 66 and generates braking actuator control signals 68 according to a stored algorithm. The braking control unit 64 then transmits the braking actuator control signals 68 to braking actuators 70, 72, 74, 76 which act to reduce the angular velocity of the wheels 16, 17, 18, 19. Those skilled in the art will recognize the manner in which the braking actuators 70, 72, 74, 76 act on the wheels 16, 17, 18, 19. Typically, actuators cause contact between friction elements, such as pads and disc rotors. Optionally, an electric motor may function as a braking actuator in a regenerative braking system.

The braking control unit 64 may also generate braking feedback signals 78 for use by a vehicle driver and transmit the braking feedback signals 78 through the connector port 28. In the preferred embodiment, the braking actuators 70, 72, 74, 76 apply force through a caliper to a rotor at each wheel. Some of the sensors 48 measure the applied force on each caliper. The braking control unit 64 uses this information to ensure synchronous force application to each rotor.

The preferred embodiment of the vehicle is configured such that the braking system 22 is responsive to any source of compatible electrical braking control signals 66. Braking transducers 80 are located in the driver control input devices 11, 13 and 14 operatively connected between the braking demand lever 33 and the steering wheel 31, and between the braking demand buttons 112, 114 and the hand grips 100, 102, respectively, and further connected to a complementary connector 42 interfitted with the connector port 28 at the connector interface 53. The braking transducers 80 convert vehicle driver-initiated mechanical movement 82 of the braking demand lever 33 and braking demand buttons 112, 114 into electrical form and transmits the electrical braking control signals 66 to the braking control unit via the connector port 28 when the braking lever 33 is squeezed toward the steering wheel 31 by a driver, or the braking demand buttons 112, 114 are pushed. The braking transducers 80 include sensors that measure both the rate of applied force and the amount of applied force to the braking lever 33 or braking buttons 112, 114, thereby converting mechanical movement 82 of the braking lever 33 or braking buttons 112, 114 into electrical braking control signals 66. The braking control unit 64 processes both the rate and amount of applied force to provide both normal and panic stopping.

Examples of brake-by-wire systems are described in U.S. Pat. No. 5,366,281, issued Nov. 22, 1994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to thee brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bidirectional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Figure 4:
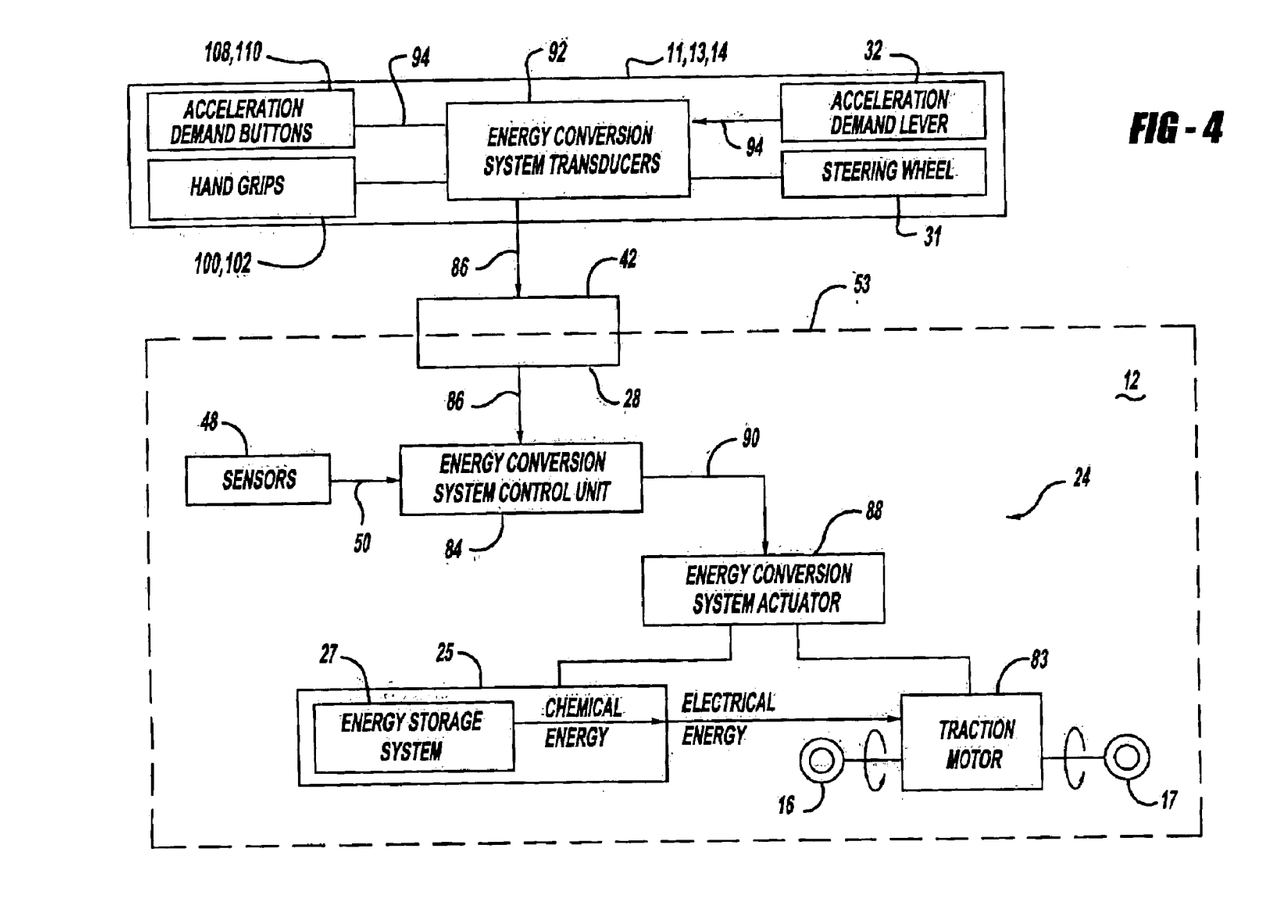
FIG. 4 is a schematic illustration of an energy conversion system for use with the vehicle of FIG. 1.

FIG. 4 is a schematic illustration of the energy conversion system 24 referenced in FIG. 1. The energy conversion system 24 includes an energy converter 25 that converts the energy stored in an energy storage system 27 to electrical energy that propels the vehicle 10. In the preferred embodiment, the energy converter 25 is operably connected to a traction motor 83. The energy converter 25 converts chemical energy into electrical energy, and the traction motor 83 converts the electrical energy to mechanical energy, and applies the mechanical energy to rotate the front wheels 16, 17. Those skilled in the art will recognize many types of energy converters 25 that may be employed within the scope of the present invention.

The energy conversion system 24 is configured to respond to non-mechanical control signals. The energy conversion system 24 of the preferred embodiment is controllable by-wire, as depicted in FIG. 4. An energy conversion system control unit 84 is connected to the connector port 28 from which it receives electrical energy conversion system control signals 86, and sensors 48 from which it receives sensor signals 50 carrying information about various vehicle conditions. In the preferred embodiment, the information conveyed by the sensor signals 50 to the energy conversion system control unit 84 includes vehicle velocity, electrical current applied, rate of acceleration of the vehicle, and motor shaft speed to ensure smooth launches and controlled acceleration. The energy conversion system control unit 84 is connected to an energy conversion system actuator 88, and transmits energy conversion system actuator control signals 90 to the energy conversion system actuator 88 in response to the electrical energy conversion system control signals 86 and sensor signals 50 according to a stored algorithm. The energy conversion system actuator 88 acts on the energy conversion system 24 or traction motor 83 to adjust energy output. Those skilled in the art will recognize the various methods by which the energy conversion system actuator 88 may adjust the energy output of the energy conversion system.

Energy conversion system transducers 92 are located in the driver control input devices 11, 13 and 14 operatively connected between the acceleration demand lever 32 and the steering wheel 31, and between the acceleration demand buttons 108, 110 and the hand grips 100, 102, and further connected to a complementary connector 42 engaged with the connector port 28 at the connector interface 53. The energy conversion system transducers 92 are configured to convert mechanical movement 94 of the acceleration demand lever 32 and acceleration demand buttons 108, 110 into electrical energy conversion system control signals 86 as the acceleration demand lever 32 is pulled toward the steering wheel 31 by a driver, or the acceleration demand buttons 108, 110 are pressed.

Figure 5:
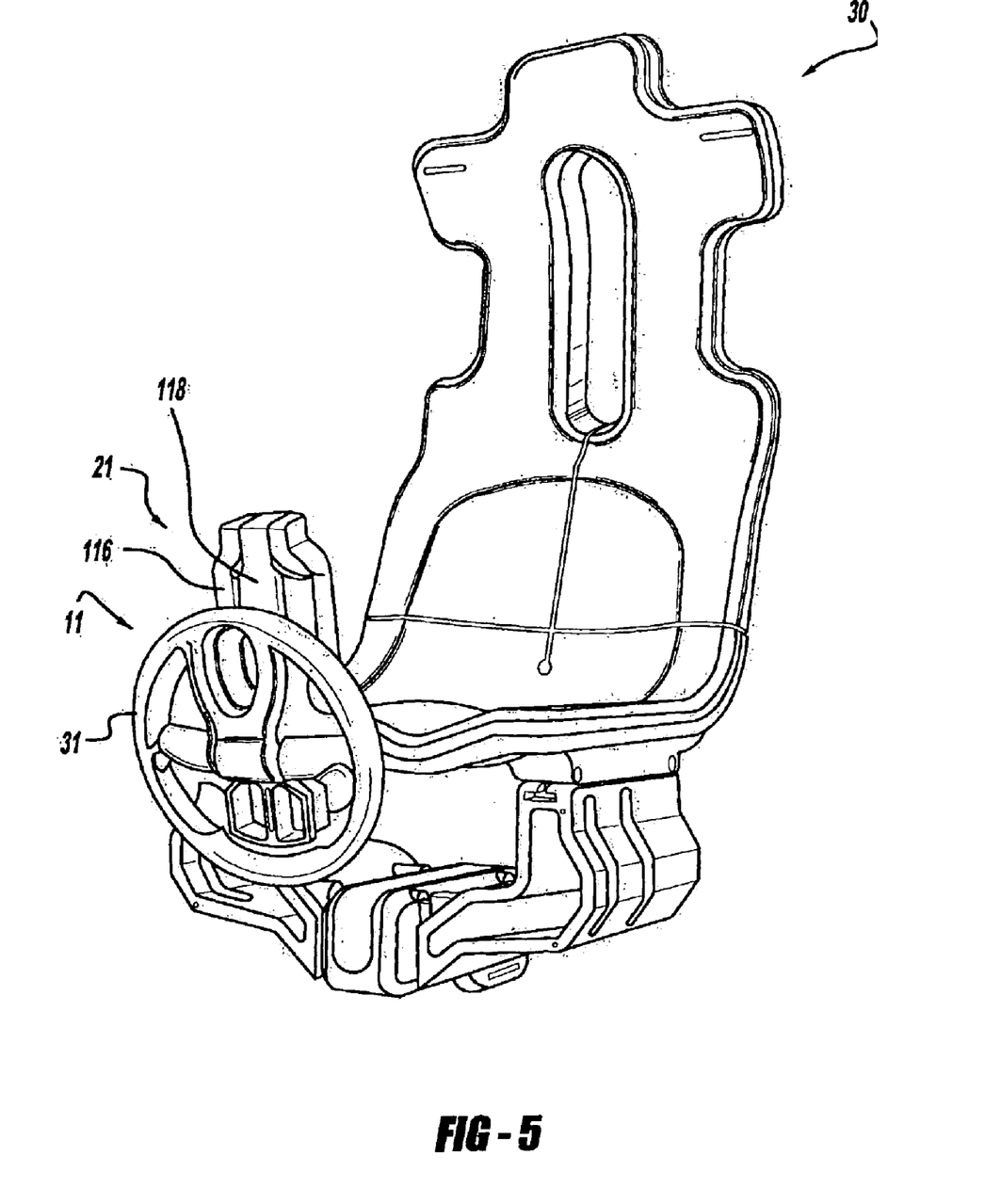
FIG. 5 is a perspective view of the vehicle seat and steering wheel structure of FIG. 1 with the steering wheel structure collapsed to a first position, having the movable arm structures removed.
Figure 6:
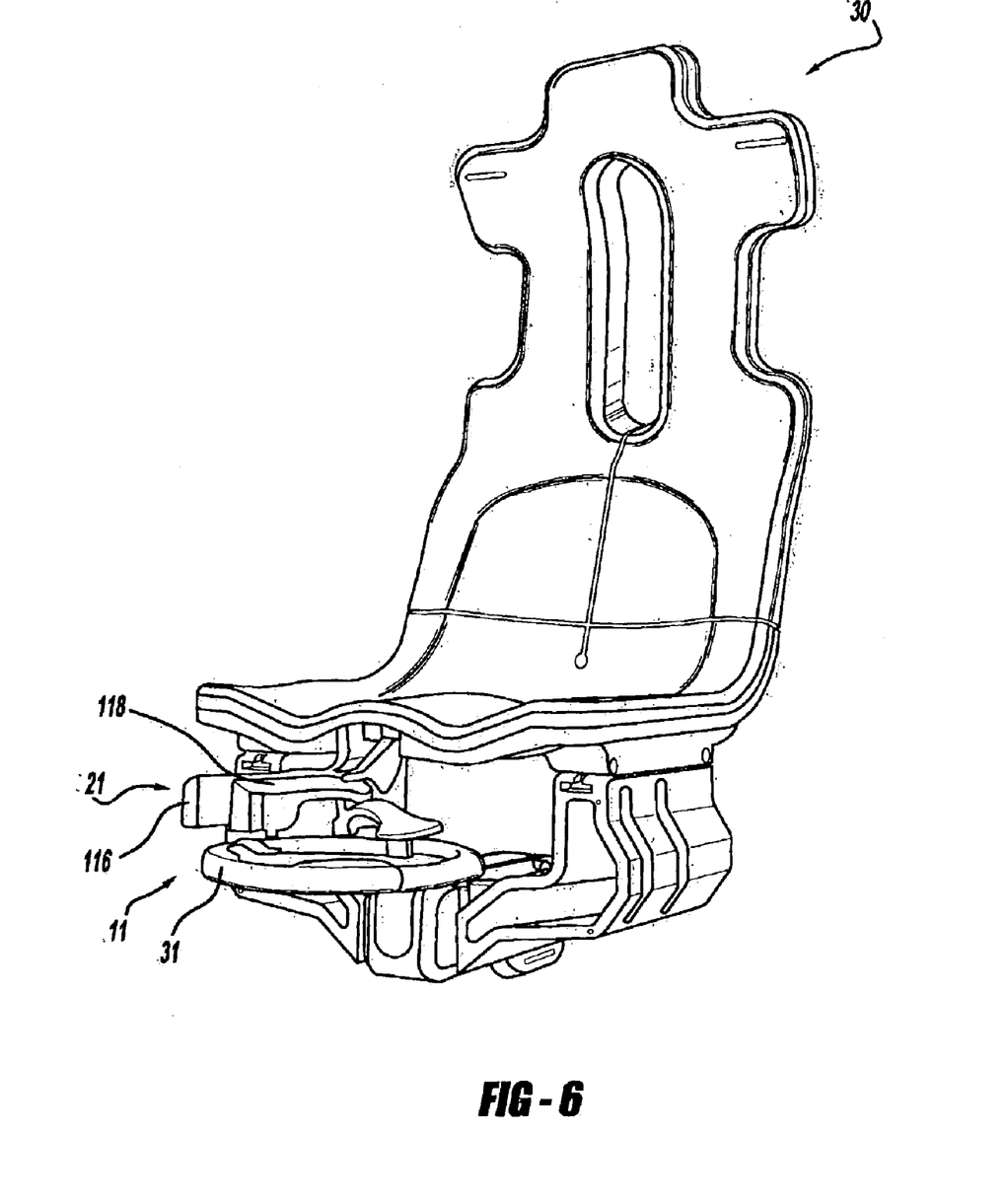
FIG. 6 is a perspective view of the seat and steering wheel structure of FIG. 1 with the steering wheel structure collapsed to a second position, having the movable arm structures removed.
Figure 7:
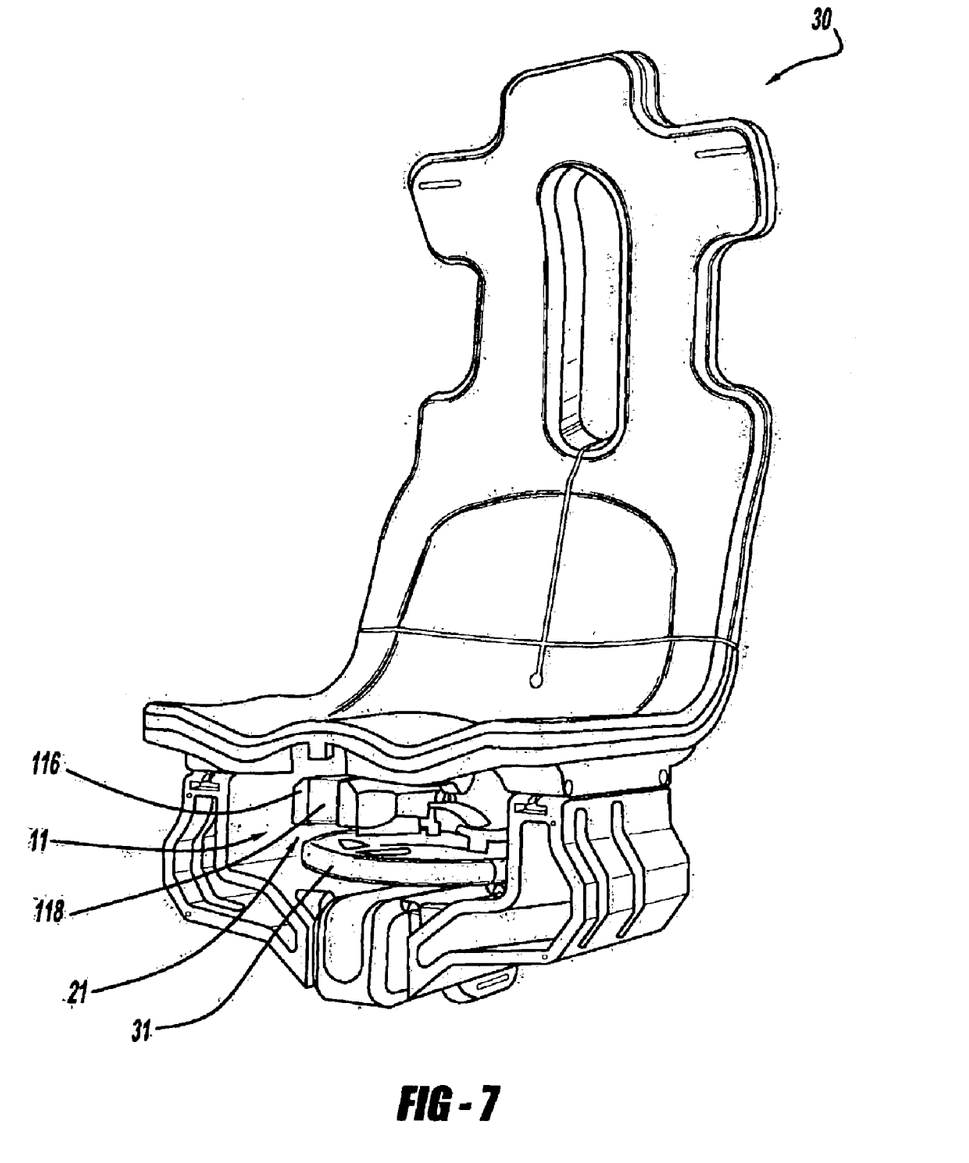
FIG. 7 is a front perspective view of the vehicle seat of FIG. 1 with the steering wheel structure collapsed to a third position for storage, having the movable arm structures removed.

FIGS. 5, 6 and 7 show sequential collapsing positions of the driver control input device 11 as it is moved to a storage position underneath the seat 30. FIG. 5 shows the upper portion 116 of the collapsible support post 21 pivoted forward and downward into a folded position co-extensive with the lower portion 118 in a first collapsed position.

FIG. 6 shows the driver control input device 11 further pivoted to a second collapsed position in which the lower portion 118 of the collapsible support post 21 is in a generally horizontal position. The lower portion 118 of the support post 21 is pivotally and slidably mounted to the bottom of the seat 30. Accordingly, from the position shown in FIG. 6, the driver control input device 11 may be slid to the third collapsed position under the seat for storage, shown in FIG. 7.

Therefore, from the position shown in FIG. 1, the driver control input device 11 may be sequentially collapsed to the positions shown in FIGS. 5, 6 and finally the stored position in FIG. 7 when the driver elects to drive the vehicle using the control input devices 13, 14 of FIG. 1.

Figure 8:
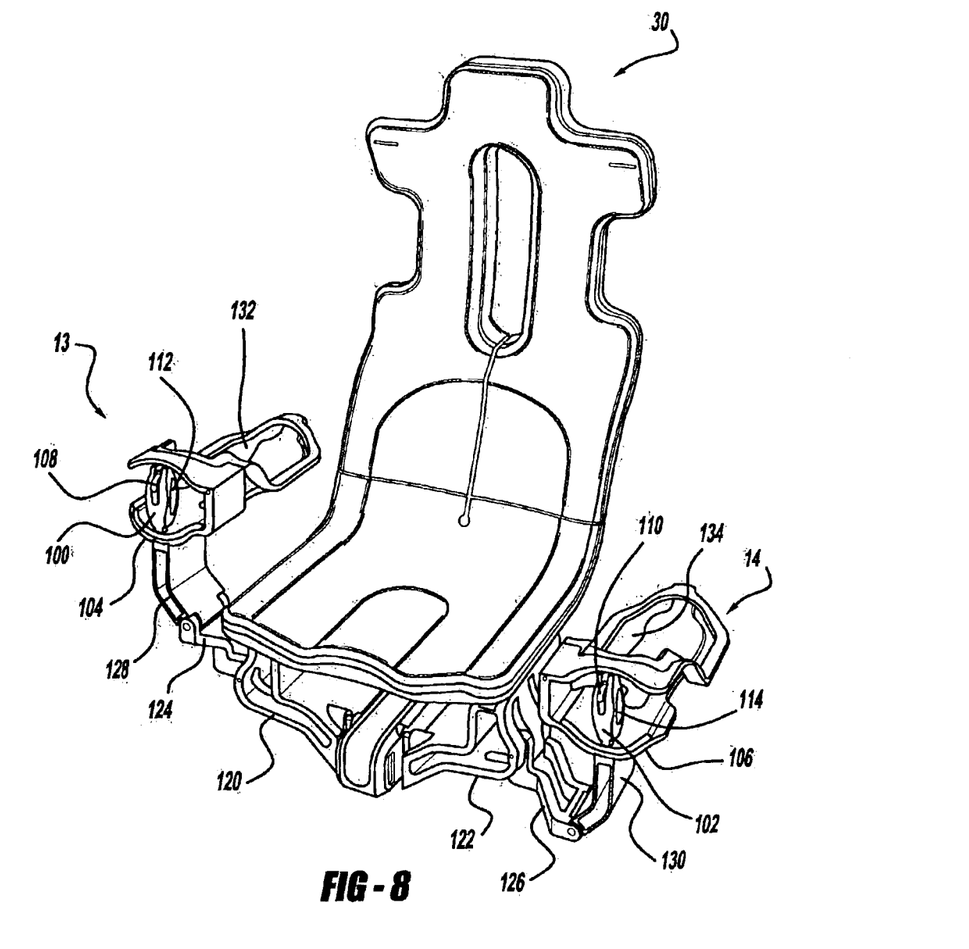
FIG. 8 shows a front perspective view of the seat and movable arm structures of FIG. 1 with one arm structure in the storage position and the other arm structure in the use position, this view having the steering wheel structure removed.
Figure 9:
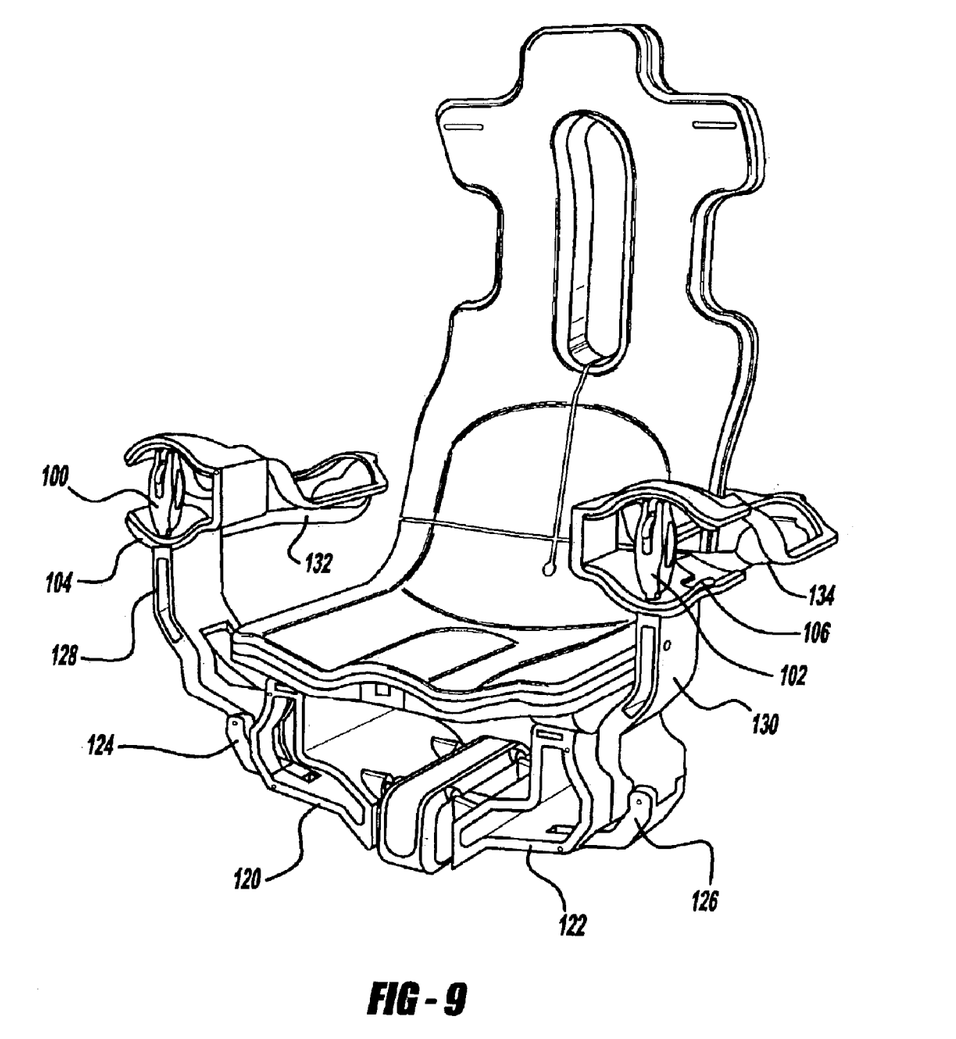
FIG. 9 is a perspective view of the seat and movable arm structures of FIG. 1 with the movable arm structures in the upright position for use, this view having the steering wheel structure removed.

FIGS. 8 and 9 show front perspective views of the seat 30 and control input devices 13, 14 of FIG. 1 with the control input device 14 in the lowered position for storage in FIG. 8 and in the raised position for use in FIG. 9. As shown, the driver control input devices 13, 14 are pivotally connected to the base 120, 122 by linkages 124, 126, respectively. The linkages 124, 126 are preferably implemented as parallelogram type linkages so that the driver control input devices 13, 14 move vertically and laterally with respect to a forward-facing direction of the seat 30 when pivoting between the lowered position, such as the position of driver control input device 14 shown in FIG. 8, and the raised position for driving, as illustrated in FIG. 9. As shown, an upper link 128, 130 supports each sleeve 104, 106, and each sleeve 104, 106 includes a forearm support portion 132, 134 to support the forearm of a driver for comfort and convenience.

For steering, the steering transducers are preferably positioned inside the support sleeves 104, 106 adjacent the hand grips 100, 102 to sense pivotal movement of the hand grips 100, 102 and to convert such pivotal movement into steering signals to be sent to the steer-by-wire system of the vehicle.

Figure 10:
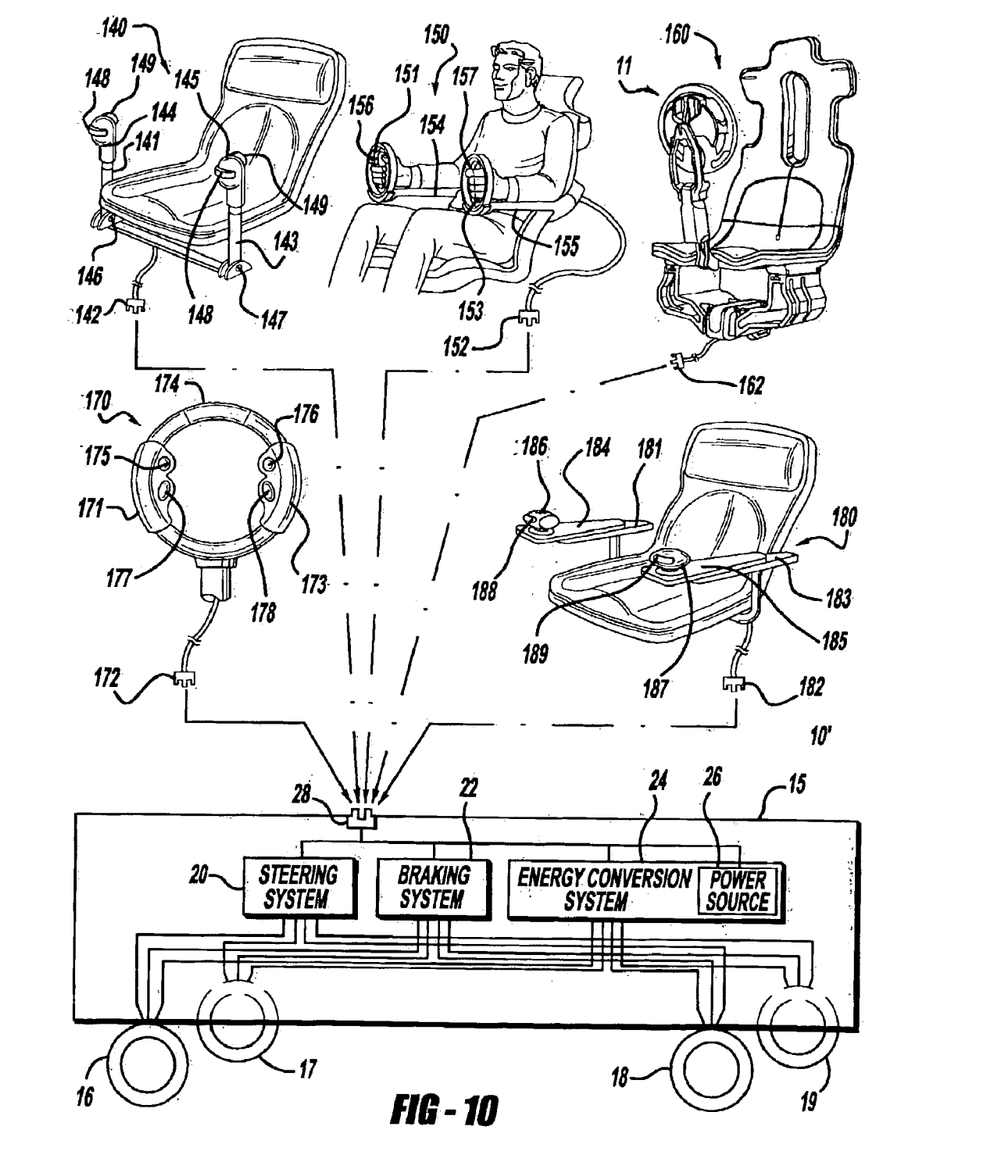
FIG. 10 is a schematic illustration of a plurality of selectable driver control input devices engageable with a vehicle for driving the vehicle in accordance with the invention.

Turning to FIG. 10, a vehicle 10' is shown substantially as represented schematically in FIG. 1, and wherein like reference numerals are used to reference like components from FIG. 1. As shown, the vehicle 10' includes the steering system 20, braking system 22 and energy conversion system 24, as described previously with reference to FIGS. 1–4. Also, a connector port 28 is provided on the vehicle 10' for receiving steering control signals, braking control signals, and acceleration control signals from a plurality of different selectable driver control input devices 140, 150, 160, 170, 180, which are each selectively connectable with, and disconnectable from, the connector port via the complementary connectors 142, 152, 162, 172, 182, respectively, for providing drive-by-wire signals to the steering system 20, braking system 22 and energy conversion system 24 of the vehicle 10'. These various driver control input devices 140, 150, 160, 170, 180 may be selectively interchanged on a vehicle as desired by a driver.

Accordingly, multiple man-machine interfaces are provided so that the vehicle may be driven by wire using a hand-operated control unit for steering, braking and accelerating the vehicle. These devices may also be redundant devices to backup other mechanical steering, braking or acceleration systems on a vehicle.

As shown, the driver control input device 140 includes first and second control posts 141, 143 each having a hand grip 144, 145. The control posts 141, 143 are pivotally movable forwardly and rearwardly about the pivot joints 146, 147, and are sufficiently linked together (with a gearing arrangement or electrically with position sensors and position adjustment motors) such that forward movement of one control post will result in an opposite rearward movement of the other control post. This pivotal movement of the control posts 141, 143 causes non-mechanical steering signals to be sent to the steer-by-wire system 20. The hand grips 144, 145 also include accelerator buttons 148 and braking buttons 149 to facilitate sending braking and acceleration signals to the brake-by-wire system 22 and energy conversion system 24.

The driver control input device 150 includes first and second rotatable hand grips 151, 153 positioned at the ends of first and second armrests 154, 155, respectively. The first and second hand grips 151, 153 are rotatable to facilitate sending steering signals to the steer-by-wire system 20. The driver simply rotates his or her wrists while the driver's arms are supported on the arm rests 154, 155. Also, an accelerator button 156 and braking button 157 are provided on the hand grips 151, 153, respectively to facilitate sending braking and acceleration signals to the braking system 22 and energy conversion system 24.

The driver control input device 160 is as shown and described with reference to FIGS. 1 and 5–9. This description will not be repeated herein. FIG. 10 shows only the steering wheel structure 11, and eliminates the first and second movable arm structures 13, 14 shown and described in detail in the earlier Figures. This description will not be repeated here.

The driver control input device 170 includes first and second movable hand grips 171, 173 which are slidably movable around a non-rotatable wheel 174 for generating steering control signals via a steering transducer operatively connected between the hand grips 171, 173 and the wheel 174. As shown, the hand grips 171, 173 include accelerator buttons 175, 176 and braking buttons 177, 178 to facilitate sending braking and acceleration signals to the brake-by-wire system 22 and energy conversion system 24 of the vehicle.

The driver control input device 180 includes first and second base members 181, 183 and first and second control members 184, 185 pivotally movable with respect to the first and second base members 181, 183 in a generally horizontal plane to facilitate sending steering control signals to the steer-by-wire system 20. The first and second control members 184, 185 include hand grips 186, 187. An accelerator button 188 and braking button 189 are positioned on the hand grips 186, 187 to facilitate sending braking and acceleration signals to the brake-by-wire system 22 and energy conversion system 24 of the vehicle 10'. The control members 184, 185 are pivoted about a driver's elbows as the driver's forearms rest on the control members 184, 185.

Accordingly, the various driver control input devices 140, 150, 160, 170, 180 may be selectively interchanged or swapped on a vehicle as desired by the driver of the vehicle, or as the functionality of the vehicle changes.

As another alternative, a by-wire steering device may include a mechanical back-up system, such as a cable and corresponding pulley system, which mechanically controls vehicle steering in the event of an electrical failure.

While the best modes for carrying out 4the invention have been described in detail, those familiar with the art to which this invention relates will recognize various alternative designs and embodiments for practicing the invention within the scope of the appended claims.

What is claimed is:

1. A vehicle driver control input assembly comprising:
    a seat;
    a steering wheel structure configured to provide non-mechanical steering signals to a steer-by-wire system, said steering wheel structure being supported by a collapsible support post which enables the steering wheel structure to be collapsed below the seat for storage; and
    first and second movable arm structures connected to opposing sides of the seat and movable between an upright position for use and a lowered position for storage, said first and second movable arm structures each including control input members to provide non-mechanical steering signals to the steer-by-wire system.

2. The vehicle driver control input assembly of claim 1, wherein said steering wheel structure and said control input members include a braking demand input mechanism for sending braking signals to a brake-by-wire system.

3. The vehicle driver control input assembly of claim 1, wherein said steering wheel structure and said control input members include an acceleration demand input mechanism for sending acceleration signals to an energy conversion system.

4. The vehicle driver control input assembly of claim 2, wherein said braking demand input mechanism comprises a braking lever adjacent a rear side of a steering wheel on the steering wheel structure.

5. The vehicle driver control input assembly of claim 2, wherein said control input members each include a rotatable hand grip, and said braking demand input mechanism comprises a braking button on each rotatable hand grip.

6. The vehicle driver control input assembly of claim 3, wherein said control input members each include a rotatable hand grip, and said acceleration demand input mechanism comprises an acceleration button on each rotatable hand grip.

7. The vehicle driver control input assembly of claim 1, wherein said first and second movable arm structures each include a support sleeve to support the forearm of a driver.

8. The vehicle driver control input assembly of claim 1, wherein said first and second movable arm structures are movable laterally and downwardly with respect to a forward-facing direction of the seat.

9. The vehicle driver control input assembly of claim 1, wherein said post includes an upper portion pivotally mounted to a lower portion, and said lower portion is pivotally and slidably mounted to the seat.

10. A vehicle comprising:
    a chassis;
    at least three wheels operable with respect to the chassis;
    a steering system mounted with respect to the chassis and responsive to non-mechanical control signals;
    a braking system mounted with respect to the chassis and responsive to non-mechanical control signals;
    an energy conversion system mounted with respect to the chassis and responsive to non-mechanical control signals;
    a seat mounted with respect to the chassis;
    a steering wheel structure configured to provide non-mechanical steering signals to the steering system, said steering wheel structure being supported by a collapsible support post which enables the steering wheel structure to be collapsed below the seat for storage; and
    first and second movable arm structures connected to opposing sides of the seat and movable vertically and laterally between an upright position for use and a lowered position for storage, said first and second movable arm structures each including control input devices to provide non-mechanical steering signals to the steering system, non-mechanical braking signals to the braking system, and non-mechanical acceleration signals to the energy conversion system.

* * * * *